United States Patent
Yang

(10) Patent No.: US 9,595,997 B1
(45) Date of Patent: Mar. 14, 2017

(54) ADAPTION-BASED REDUCTION OF ECHO AND NOISE

(71) Applicant: Amazon Technologies, Inc., Seattle, WA (US)

(72) Inventor: Jun Yang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 398 days.

(21) Appl. No.: 13/733,033

(22) Filed: Jan. 2, 2013

(51) Int. Cl.
| G10L 21/00 | (2013.01) |
| H04B 3/23 | (2006.01) |
| G10L 15/20 | (2006.01) |
| G10L 21/0208 | (2013.01) |

(52) U.S. Cl.
CPC ............... H04B 3/23 (2013.01); G10L 15/20 (2013.01); G10L 21/0208 (2013.01)

(58) Field of Classification Search
CPC ..... G10L 21/00; G10L 21/02; G10L 21/0202; G10L 21/0208; G10L 25/00; G10L 25/78; G10L 25/93; G10L 2021/00; G10L 2021/02; G10L 2021/0208; G10L 2021/02082; G10L 2025/00; G10L 2025/93; G10L 2025/932; G10L 2025/935; G10L 2025/937; H04B 3/20; G11B 20/24
USPC ....... 704/200, 226, 227, 228, 233; 381/71.1, 381/94.1–94.9
See application file for complete search history.

(56) References Cited

U.S. PATENT DOCUMENTS

| 5,548,681 | A | * | 8/1996 | Gleaves et al. ............... 704/233 |
| 5,740,256 | A | * | 4/1998 | Castello Da Costa | H04B 7/015 381/94.7 |
| 5,937,060 | A | * | 8/1999 | Oh ........................... 379/406.14 |
| 6,181,753 | B1 | * | 1/2001 | Takada et al. ................. 375/346 |
| 6,466,666 | B1 | * | 10/2002 | Eriksson ................... 379/406.01 |
| 7,054,451 | B2 | * | 5/2006 | Janse et al. ...................... 381/83 |
| 7,418,392 | B1 | | 8/2008 | Mozer et al. |
| 7,590,528 | B2 | * | 9/2009 | Kato et al. .................... 704/226 |
| 7,720,683 | B1 | | 5/2010 | Vermeulen et al. |
| 7,773,759 | B2 | * | 8/2010 | Alves et al. ................. 381/71.1 |
| 7,774,204 | B2 | | 8/2010 | Mozer et al. |
| 8,111,840 | B2 | * | 2/2012 | Haulick et al. ................. 381/93 |
| 8,184,828 | B2 | * | 5/2012 | Christoph .................... 381/94.2 |
| 8,189,810 | B2 | * | 5/2012 | Wolff et al. .................. 381/94.1 |

(Continued)

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Paras D Shah

(74) *Attorney, Agent, or Firm* — Lee & Hayes, PLLC

(57) ABSTRACT

The systems, devices, and processes described herein may generate a signal, such as an audio signal or an electrical signal, that may include echo and/or noise. The echo may be at least partially canceled based at least in part on acoustic echo cancellation or local echo cancellation, while the noise may be at least partially reduced based at least in part on noise reduction. A residual amount of echo and/or noise may then be determined. The residual echo and/or noise may be suppressed based at least in part on adaptive filtering of the signal, which may include modifying weights of an algorithm associated with an adaptive filter.

23 Claims, 10 Drawing Sheets

(56) References Cited

U.S. PATENT DOCUMENTS

| | | | |
|---|---|---|---|
| 8,213,596 B2 * | 7/2012 | Beaucoup et al. | 379/406.08 |
| 8,271,279 B2 * | 9/2012 | Hetherington et al. | 704/233 |
| 8,385,557 B2 * | 2/2013 | Tashev et al. | 381/66 |
| 8,406,430 B2 * | 3/2013 | Beaugeant et al. | 381/66 |
| 8,660,275 B2 * | 2/2014 | Buck et al. | 381/92 |
| 8,731,210 B2 * | 5/2014 | Cheng et al. | 381/92 |
| 8,861,756 B2 * | 10/2014 | Zhu et al. | 381/300 |
| 2006/0007872 A1 * | 1/2006 | Liu | 370/286 |
| 2006/0153360 A1 * | 7/2006 | Kellermann et al. | 379/406.08 |
| 2006/0210091 A1 * | 9/2006 | Okumura | H04R 3/02 381/71.11 |
| 2007/0047743 A1 * | 3/2007 | Taenzer et al. | 381/92 |
| 2007/0071253 A1 * | 3/2007 | Sato et al. | G10L 21/0208 381/94.3 |
| 2007/0274535 A1 * | 11/2007 | Mao | 381/94.1 |
| 2008/0031467 A1 * | 2/2008 | Haulick et al. | 381/66 |
| 2008/0085009 A1 * | 4/2008 | Merks et al. | H04M 9/082 381/66 |
| 2008/0152156 A1 * | 6/2008 | Gao | 381/66 |
| 2008/0304675 A1 * | 12/2008 | Roovers | 381/66 |
| 2009/0089054 A1 * | 4/2009 | Wang et al. | 704/233 |
| 2010/0074434 A1 * | 3/2010 | Kobayashi | 379/406.08 |
| 2010/0189274 A1 * | 7/2010 | Thaden et al. | 381/66 |
| 2011/0110526 A1 * | 5/2011 | Ishibashi et al. | 381/66 |
| 2011/0153313 A1 * | 6/2011 | Etter | 704/200.1 |
| 2012/0201370 A1 * | 8/2012 | Mazurenko et al. | 379/406.1 |
| 2012/0223885 A1 | 9/2012 | Perez | |
| 2012/0250871 A1 * | 10/2012 | Lu et al. | 381/66 |
| 2012/0250882 A1 * | 10/2012 | Mohammad et al. | 381/94.1 |
| 2013/0121498 A1 * | 5/2013 | Giesbrecht | 381/66 |
| 2013/0151247 A1 * | 6/2013 | Lou et al. | 704/226 |
| 2014/0003635 A1 * | 1/2014 | Mohammad et al. | 381/306 |
| 2014/0123745 A1 * | 5/2014 | Green et al. | 73/150 R |
| 2014/0307883 A1 * | 10/2014 | Buck et al. | 381/66 |

* cited by examiner

US 9,595,997 B1

ADAPTION-BASED REDUCTION OF ECHO AND NOISE

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

When interacting with a device through speech, a device may perform automatic speech recognition (ASR) on audio signals generated from sound captured within an environment for the purpose of identifying voice commands within the signals. However, the presence of audio signals in addition to a user's voice command (e.g., background noise, etc.) may make difficult the task of performing ASR on the audio signals. In addition, acoustic echo may result when a microphone detects and captures audio signals output from a speaker that is situated in the same room. The acoustic echo may cause the user to hear their own voice and may cause the user to have difficulties understanding a voice from a far-end user. The acoustic echo may also prevent a system from detecting voice commands uttered by the user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
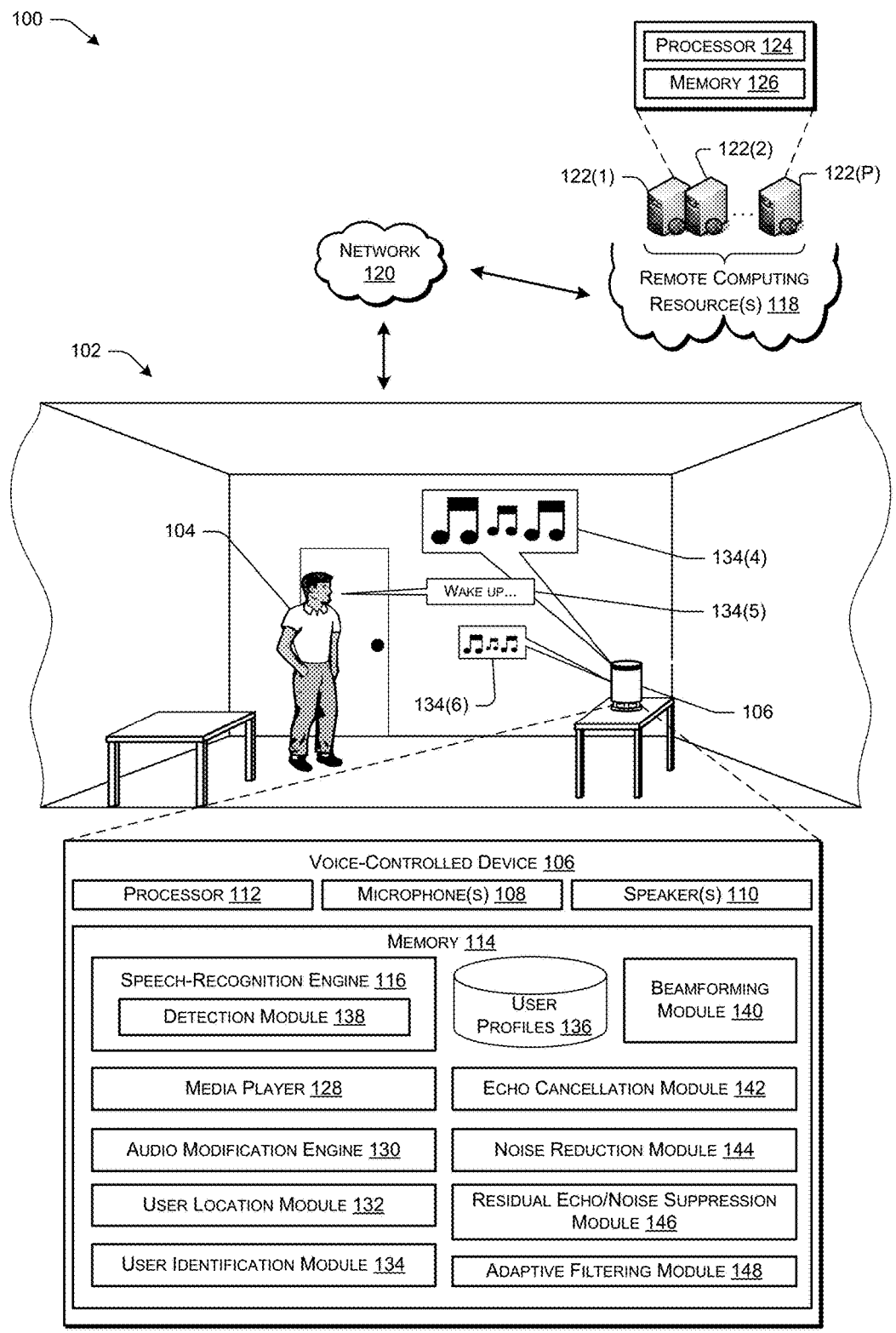
FIG. 1 shows an illustrative voice interaction computing architecture that may be set in a home environment. The architecture includes a voice-controlled device physically situated in the environment, along with one or more users who may wish to provide a command to the device. In response to detecting a particular voice or predefined word within the environment, the device may reduce or cancel echo detected within the environment as well as reduce other noise within the environment in order to increase the accuracy of automatic speech recognition (ASR) performed by the device.

The systems and/or processes described herein are directed to reducing the amount of noise (e.g., background noise, ambient noise, etc.) and echo (e.g., acoustic echo, local echo, etc.) with respect to audio captured within an environment and/or an audio signal output within the environment. More particularly, in response to detecting audio (e.g., a voice) associated with a user within the environment, the systems and/or processes described herein may perform various techniques with respect to an audio signal that is output, such as beamforming (e.g., spatial filtering), echo cancellation (e.g., acoustic echo, local echo, etc.), noise reduction, and residual echo/noise suppression. In some embodiments, reducing the amount of echo associated with the audio signal may be performed by one or more adaptive filters that reduce or suppress the echo utilizing residual echo suppression. In particular, the weights of algorithms associated with an adaptive filter may be dynamically updated after adaptation of the audio signal. The updated weights may then be passed to a second filter, which may utilize those updated weights to suppress any residual echo and/or noise with respect to the audio signal.

Various speech or voice detection techniques may be utilized by devices within an environment to detect, process, and determine one or more words uttered by a user. Beamforming or spatial filtering may be used in the context of sensor array signal processing in order to perform signal enhancement, interference suppression, and direction of arrival (DOA) estimation. In particular, spatial filtering may be useful within an environment since the audio of interest (e.g., a voice) and interference (e.g., background noise) may be spatially separated. Since adaptive directionality may allow a device to be able to track time-varying and/or moving noise sources, devices utilizing adaptive directionality may be desirable with respect to detecting and recognizing user commands within the environment. For instance, oftentimes a device is situated within an environment that has various types of audio that the device would like to detect and enhance (e.g., user commands) and audio that the device would like to ignore or suppress (e.g., ambient noise, other voices, etc.). Since a user is likely to speak on an ongoing basis and possibly move within the environment, adaptive directionality may allow the device to better identify words or phrases uttered by a user.

In addition to unwanted noise being detected within the environment, acoustic echo within the environment may make it difficult to detect and interpret the voice of a particular user. For instance, with respect to a device having both a speaker and a microphone, when audio (e.g., a voice, music, etc.) is generated within the environment, the audio signal may be output by the speaker and then the corresponding sound may be detected/captured by the microphone. Accordingly, a user within the environment may hear their own voice being repeated, which results in a poor user experience and may cause difficulties in determining voice commands uttered by the user. In some embodiments, the amount of echo associated with the audio signal may be reduced by utilizing adaptive directionality and various acoustic echo cancellation techniques.

However, a residual amount of echo may still exist, which may be caused by the inability of an adaptive filter to model the transfer path of the acoustic echo, an insufficient length of the adaptive filter, or non-linearity with respect to the echo path. Moreover, existing techniques for reducing or suppressing the residual echo are complicated, often cannot be implemented in low power devices, and may cause the detected audio (e.g., voice) to be distorted or chopped. More particularly, existing techniques that attempt to reduce the residual echo may fail to actually reduce the residual echo and may instead result in unnaturally sounding residual echo and/or noise. For instance, user movement within the environment may result in echo path change, and the volume change of the speaker may cause time-varying echo, especially when the echo path changes more rapidly than the convergence rate of the adaptive filter. Moreover, when a user within the environment is talking, the adaptive filter may be misled into adjusting itself to what the adaptive filter perceives to be a change in the acoustic echo path.

Accordingly, the systems and processes described herein relate to a more practical and effective process for canceling, suppressing, and/or eliminating residual echo and/or noise within an environment, as will be discussed in additional detail below. The devices and techniques described above and below may be implemented in a variety of different architectures and contexts. One non-limiting and illustrative implementation is described below.

FIG. 1 shows an illustrative voice interaction computing architecture 100 set in an environment 102, such as a home environment 102, that includes a user 104. The architecture 100 also includes an electronic voice-controlled device 106 (interchangeably referred to as "device 106") with which the user 104 may interact. In the illustrated implementation, the voice-controlled device 106 is positioned on a table within a room of the environment 102. In other implementations, it may be placed in any number of locations (e.g., ceiling, wall, in a lamp, beneath a table, under a chair, etc.). Further, more than one device 106 may be positioned in a single room, or one device 106 may be used to accommodate user interactions from more than one room.

Generally, the voice-controlled device 106 may have a microphone unit that includes at least one microphone 108 (and potentially multiple microphones 108) and a speaker unit that includes at least one speaker 110 to facilitate audio interactions with the user 104 and/or other users 104. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 2.

The microphone(s) 108 of the voice-controlled device 106 may detect audio (e.g. audio signals) from the environment 102, such as sounds uttered from the user 104, other noise within the environment 102, and/or acoustic echo within the environment 102 that is associated with the audio of a speaker associated with the voice-controlled device 106. As illustrated, the voice-controlled device 106 may include a processor 112 and memory 114, which stores or otherwise has access to a speech-recognition engine 116. As used herein, the processor 112 may include multiple processors 112 and/or a processor 112 having multiple cores. The speech-recognition engine 116 may perform speech recognition on audio signals generated by the microphone(s) 108, with these signals being generated from sound within the environment 102, such as utterances spoken by the user 104. The voice-controlled device 106 may perform certain actions in response to recognizing different speech from the user 104. The user 104 may speak predefined commands (e.g., "Awake", "Sleep", etc.), or may use a more casual conversation style when interacting with the device 106 (e.g., "I'd like to go to a movie. Please tell me what's playing at the local cinema.").

In some instances, the voice-controlled device 106 may operate in conjunction with or may otherwise utilize computing resources 118 that are remote from the environment 102. For instance, the voice-controlled device 106 may couple to the remote computing resources 118 over a network 120. As illustrated, the remote computing resources 118 may be implemented as one or more servers 122(1), 122(2), . . . , 122(P) and may, in some instances, form a portion of a network-accessible computing platform implemented as a computing infrastructure of processors 112, storage, software, data access, and so forth that is maintained and accessible via a network 120 such as the Internet. The remote computing resources 118 may not require end-user knowledge of the physical location and configuration of the system that delivers the services. Common expressions associated for these remote computing resources 118 may include "on-demand computing", "software as a service (SaaS)", "platform computing", "network-accessible platform", "cloud services", "data centers", and so forth.

The servers 122(1)-(P) may include a processor 124 and memory 126, which may store or otherwise have access to some or all of the components described with reference to the memory 114 of the voice-controlled device 106. For instance, the memory 126 may have access to and utilize the speech-recognition engine 116 for receiving audio signals from the device 106, recognizing, and differentiating between, speech and other noise and, potentially, causing an action to be performed in response. In some examples, the voice-controlled device 106 may upload audio data to the remote computing resources 118 for processing, given that the remote computing resources 118 may have a computational capacity that exceeds the computational capacity of the voice-controlled device 106. Therefore, the voice-controlled device 106 may utilize the speech-recognition engine 116 at the remote computing resources 118 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 118 may perform speech recognition to interpret a user's 104 operational request or command. The requests may be for essentially type of operation, such as authentication, database inquires, requesting and consuming entertainment (e.g., gaming, finding and playing music, movies or other content, etc.), personal management (e.g., calendaring, note taking, etc.), online shopping, financial transactions, and so forth. The speech recognition engine 116 may also interpret noise and/or acoustic echo detected by the microphone(s) 108 and determine that the noise/acoustic echo is not from the target source (e.g., the user 104). To interpret the user's 104 speech, an adaptive filter associated with the speech recognition engine 116 may make a distinction between the target voice (of the user 104) and acoustic echo and other noise within the environment 102 (e.g., other voices, audio from a television, background sounds from a kitchen, etc.). As a result, the adaptive filter may be configured to enhance the target voice while suppressing both ambient noise that is detected within the environment 102 and the acoustic echo that is generated within the environment 102.

The voice-controlled device 106 may communicatively couple to the network 120 via wired technologies (e.g., wires, USB, fiber optic cable, etc.), wireless technologies (e.g., RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

As illustrated, the memory 114 of the voice-controlled device 106 may also store or otherwise has access to the speech recognition engine 116, a media player 128, an audio modification engine 130, a user location module 132, a user identification module 134, and one or more user profiles 136. Although not shown, in other embodiments, the speech recognition engine 116, the media player 128, the audio modification engine 130, the user location module 132, the user identification module 134, and the one or more user profiles 136 may be maintained by, or associated with, one of the remote computing resources 118. The media player 128 may function to output any type of content on any type of output component of the device 106. For instance, the media player 128 may output audio of a video or standalone audio via the speaker 110. For instance, the user 104 may interact (e.g., audibly) with the device 106 to instruct the media player 128 to cause output of a certain song or other audio file.

The audio modification engine 130, meanwhile, functions to modify the output of audio being output by the speaker 110 or a speaker of another device for the purpose of increasing efficacy of the speech recognition engine 116. For instance, in response to receiving an indication that the user 104 is going to provide a voice command to the device 106, the audio modification engine 130 may somehow modify the output of the audio to increase the accuracy of speech recognition performed on an audio signal generated from sound captured by the microphone 108. The engine 130 may modify output of the audio being output by the device 106, or audio being output by another device that the device 106 is able to interact with (e.g., wirelessly, via a wired connection, etc.).

As described above, the audio modification engine 130 may attenuate the audio, pause the audio, switch output of the audio from stereo to mono, attenuate a particular frequency range of the audio, turn off one or more speakers 110 outputting the audio or may alter the output of the audio in any other way. Furthermore, the audio modification engine 130 may determine how or how much to alter the output the audio based on one or more of an array of characteristics, such as a distance between the user 104 and the device 106, a direction of the user 104 relative to the device 106 (e.g., which way the user 104 is facing relative to the device 106), the type or class of audio being output, the identity of the user 104 himself, a volume of the user's 104 speech indicating that he is going to provide a subsequent voice command to the device 106, or the like.

The user location module 132 may function to identify a location of the user 104 within the environment 102, which may include the actual location of the user 104 in a two-dimensional (2D) or a three-dimensional (3D) space, a distance between the user 104 and the device 106, a direction of the user 104 relative to the device 106, or the like. The user location module 132 may determine this location information in any suitable manner. In some examples, the device 106 includes multiple microphones 108 that each generates an audio signal based on sound that includes speech of the user 104 (e.g., the user 104 stating "wake up" to capture the device's 106 attention). In these instances, the user location module 132 may utilize time-difference-of-arrival (TDOA) techniques to determine a distance of the user 104 from the device 106. That is, the user location module 132 may cross-correlate the times at which the different microphones 108 received the audio to determine a location of the user 104 relative to the device 106 and, hence, a distance between the user 104 and the device 106.

In another example, the device 106 may include a camera that captures images of the environment 102. The user location module 132 may then analyze these images to identify a location of the user 104 and, potentially, a distance of the user 104 to the device 106 or a direction of the user 104 relative to the device 106. Based on this location information, the audio modification engine 130 may determine how to modify output of the audio (e.g., whether to turn off a speaker 110, whether to instruct the media player 128 to attenuate the audio, etc.).

Next, the user identification module 134 may utilize one or more techniques to identify the user 104, which may be used by the audio modification module 130 to determine how to alter the output of the audio. In some instances, the user identification module 134 may work with the speech recognition engine 116 to determine a voice print of the user 104 and, thereafter, may identify the user 104 based on the voice print. In examples where the device 106 includes a camera, the user identification module 134 may utilize facial recognition techniques on images captured by the camera to identify the user 104. In still other examples, the device 106 may engage in a back-and-forth dialogue to identify and authenticate the user 104. Of course, while a few examples have been listed, the user identification module 134 may identify the user 104 in any other suitable manner.

After identifying the user 104, the device 106 (e.g., the audio modification engine 130 or the user identification module 134) may reference a corresponding user profile 136 of the identified user 104 to determine how to alter the output of the audio. For instance, one user 104 may have configured the device 106 to pause the audio, while another user 104 may have configured the device 106 to attenuate the audio. In other instances, the device 106 may itself determine how best to alter the audio based on one or more characteristics associated with the user 104 (e.g., a general volume level or frequency of the user's 104 speech, etc.). In one example, the device 106 may identify a particular frequency range associated with the identified user 104 and may attenuate that frequency range in the audio being output.

In various embodiments, the speech-recognition module 116 may include, or be associated with, a detection module 138, a beamforming module 140, an echo cancellation module 142, a noise reduction module 144, a residual echo/noise suppression module 146, and an adaptive filtering module 148. The detection module 138 may be associated with the one or more microphones 108 of the voice-controlled device 106 and may detect audio or other signals (e.g., electrical signals) within the environment 102. For instance the detection module 138 may detect a voice from a target user 104, ambient or background noise within the environment 102, and/or acoustic echo associated with the detected voice that exists within the environment 102.

In some embodiments, the beamforming module 140 may perform beamforming or spatial filtering with respect to audio signals that are associated with the captured audio and that are output by the one or more microphones 108. Moreover, the echo cancellation module 142 may remove echo associated with an audio signal for the purpose of improving the quality of the audio signal. In this embodiment, the echo cancellation module 142 may serve as an acoustic echo cancellation module. In other embodiments, the echo cancellation module 142 may serve as a local echo cancellation module, which may suppress or cancel electrical echo.

Furthermore, the noise reduction module 144 may reduce the amount of ambient noise that is from the environment 102 and that is presented in the outputted audio signal. For instance, the noise reduction module 144 may suppress or reduce the amount of background noise (e.g., other voices, television noise, etc.) that is associated with the audio signal such that the voice of a particular user 104 associated with the audio signal is enhanced. In further embodiments, the residual echo/noise suppression module 146 may suppress residual echo/noise that is detected within the environment 102. For example, in response to performing beamforming, noise reduction, and/or echo cancellation with respect to a detected audio signal, residual echo and/or noise may still be present. As a result, the residual echo/noise suppression module 146 may enhance the detected audio signal by suppressing the residual echo and/or noise associated with the audio signal. In some embodiments, the adaptive filtering module 148, which may be included within, or associated with, the residual echo/noise suppression module 146, may suppress or cancel the residual echo and/or noise utilizing one or more adaptive filters. More particularly, the adaptive filtering module 148 (or an adaptive filter) may suppress the residual echo/noise by modifying weights associated with one or more algorithms in response to adaptation of the detected audio signal. The modified and updated weights may be copied to a second filter that suppresses the residual echo and/or noise.

Figure 2:
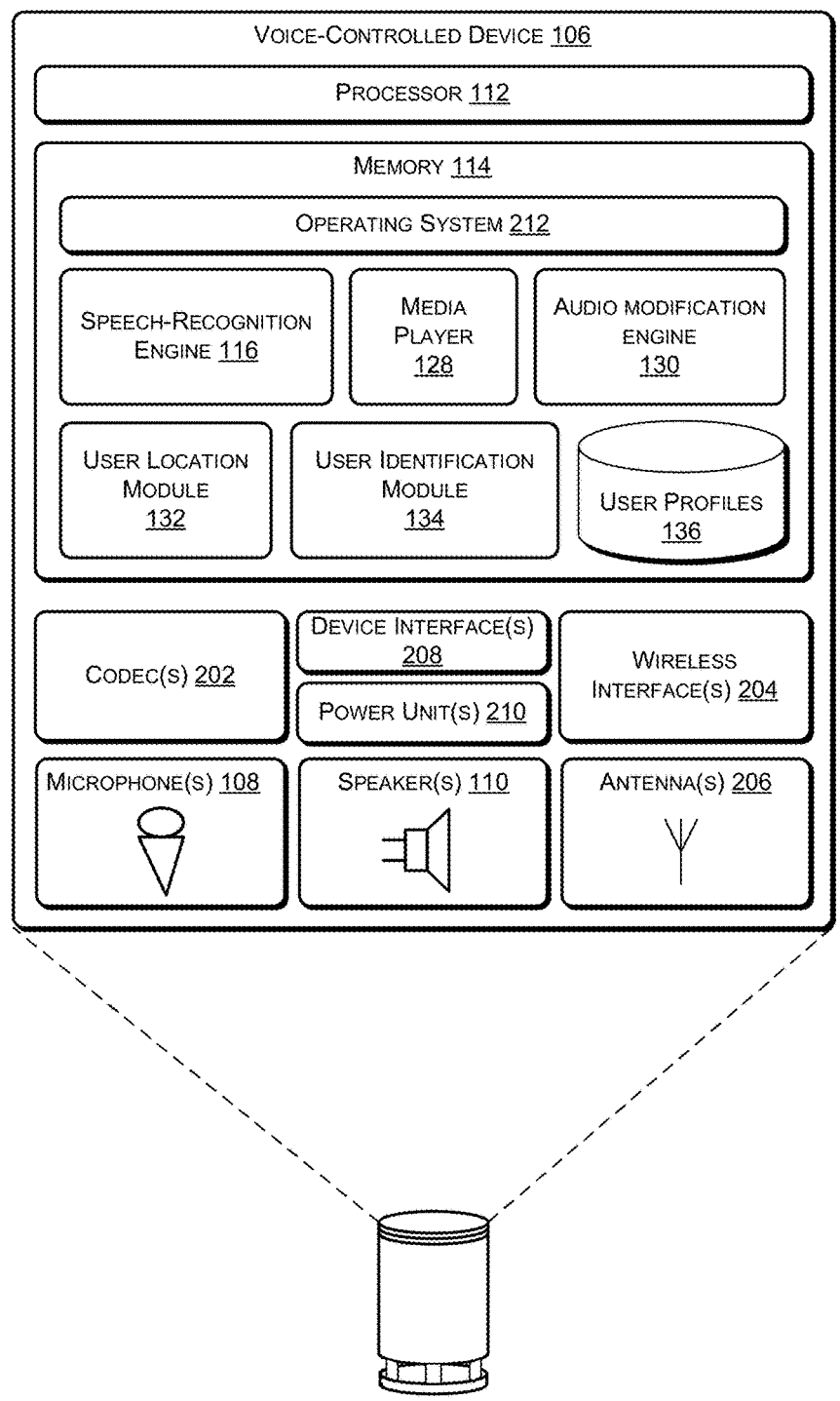
FIG. 2 shows a block diagram of selected functional components implemented in the voice-controlled device of FIG. 1.

FIG. 2 shows selected functional components and/or modules of one implementation of the voice-controlled device 106 in more detail. Generally, the voice-controlled device 106 may be implemented as a standalone device 106 that is relatively simple in terms of functional capabilities with limited input/output components, memory 114 and processing capabilities. For instance, the voice-controlled device 106 may not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 may include the processor 112 and memory 114. The memory 114 may include computer-readable storage media ("CRSM"), which may be any available physical media accessible by the processor 112 to execute instructions stored on the memory 114. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 112.

The voice-controlled device 106 may include a microphone unit that comprises one or more microphones 108 to receive audio input, such as user voice input and/or other noise. The device 106 also includes a speaker unit that includes one or more speakers 110 to output audio sounds. One or more codecs 202 are coupled to the microphone 108 and the speaker 110 to encode and/or decode the audio signals. The codec 202 may convert audio data between analog and digital formats. A user 104 may interact with the device 106 by speaking to it, and the microphone 108 may capture sound and generate an audio signal that includes the user speech. The codec 202 may encode the user speech and transfer that audio data to other components. The device 106 can communicate back to the user 104 by emitting audible statements through the speaker 110. In this manner, the user 104 interacts with the voice-controlled device 106 simply through speech, without use of a keyboard or display common to other types of devices.

In the illustrated example, the voice-controlled device 106 may include one or more wireless interfaces 204 coupled to one or more antennas 206 to facilitate a wireless connection to a network. The wireless interface 204 may implement one or more of various wireless technologies, such as Wi-Fi, Bluetooth, radio frequency (RF), and so on.

One or more device interfaces 208 (e.g., USB, broadband connection, etc.) may further be provided as part of the device 106 to facilitate a wired connection to a network, or a plug-in network device that communicates with other wireless networks. One or more power units 210 may further be provided to distribute power to the various components of the device 106.

The voice-controlled device 106 may be designed to support audio interactions with the user 104, in the form of receiving voice commands (e.g., words, phrase, sentences, etc.) from the user 104 and outputting audible feedback to the user 104. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., LEDs around perimeter of a top portion of the device 106) to indicate a state such as, for example, when power is on or to indicate when a command is received. But, otherwise, the device 106 may not use or need to use any input devices or displays in some instances.

Several modules such as instructions, datastores, and so forth may be stored within the memory 114 and configured to execute on the processor 112. An operating system 212 may be configured to manage hardware and services (e.g., wireless unit, Codec, etc.) within, and coupled to, the device 106 for the benefit of other modules.

In addition, the memory 114 may include the speech-recognition engine 116, the media player 128, the audio modification engine 130, the user location module 132, the user identification module 134 and the user profiles 136. Although not shown in FIG. 2, the memory 114 may also include the beamforming module 140, the echo cancellation module 142, the noise reduction module 144, the residual echo/noise suppression module 146, and/or the adaptive filtering module 148. Also as discussed above, some or all of these engines, data stores, and components may reside additionally or alternatively at the remote computing resources 118.

Figure 3:
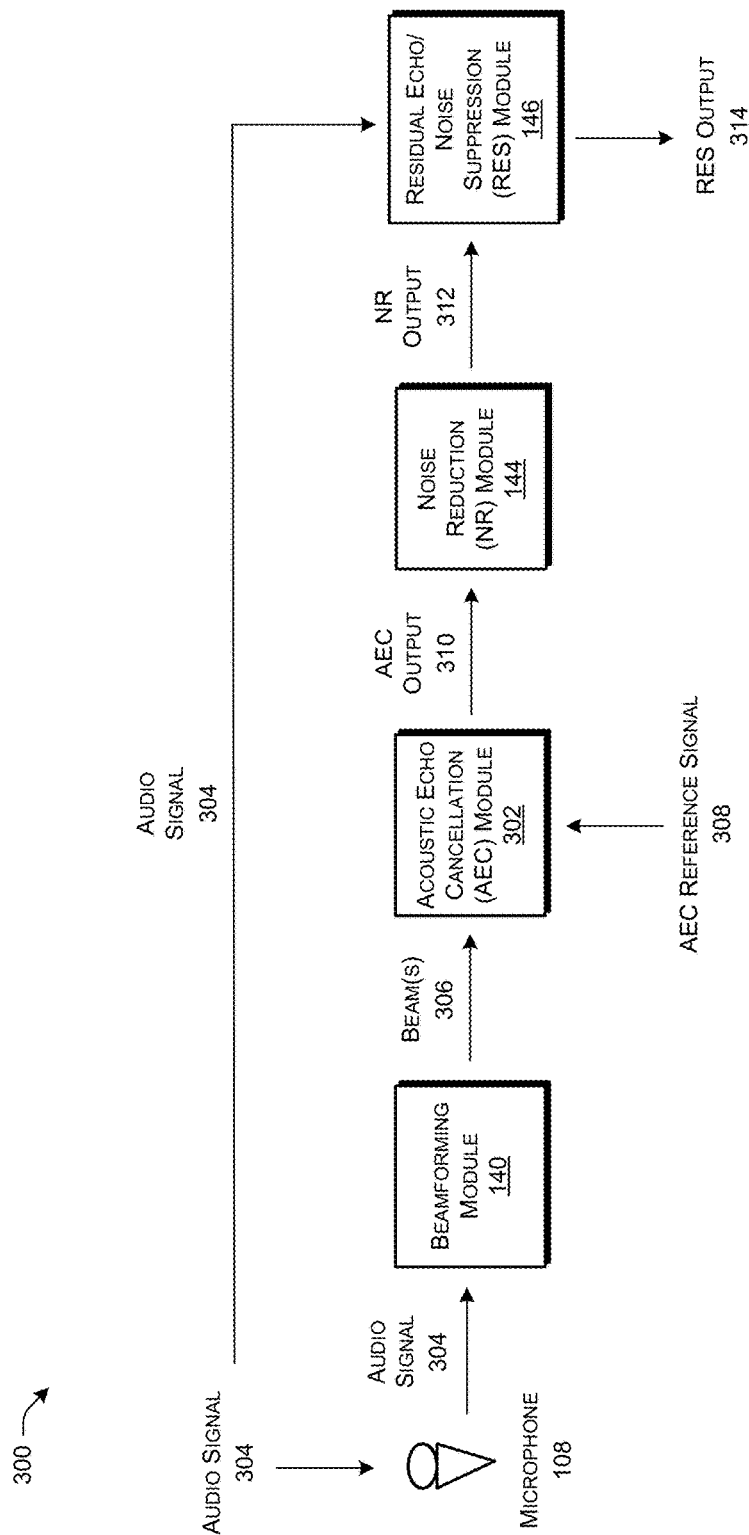
FIG. 3 shows an illustrative system for performing beamforming, acoustic echo cancellation, noise reduction, and residual echo/noise suppression with respect to an audio signal.

FIG. 3 shows an illustrative system 300 for reducing or eliminating acoustic echo and noise associated with an audio signal associated with an environment. More particularly, in response to detecting or capturing audio within the environment 102, the system 300 may perform beamforming, acoustic echo cancellation (AEC), noise reduction (NR), and residual echo/noise suppression (RES) in order to cancel, suppress, and eliminate noise (e.g., ambient or background noise), acoustic echo, and residual echo and noise within an audio signal associated with the environment 102. As a result, the system 300 may perform at least a dual function—(1) reducing noise, including residual noise, with respect to the audio signal (e.g., reducing ambient noise) and (2) suppressing acoustic echo, including residual echo, with respect to the audio signal, which both allow the system 100 to better detect audio and interpret the audio signal. In various embodiments, the processes illustrated in the system 300 of FIG. 3 may be performed by the voice-controlled device 106.

As shown, the system 300 may include one or more microphones 108, the beamforming module 140, an acoustic echo cancellation module 302, a noise reduction module 144, and the residual echo/noise suppression module 146. In some embodiments, the microphone 108 may detect and/or capture audio within the environment 102, and may output an audio signal 304 that corresponds to the detected audio, where the audio signal 304 may correspond to the voice of a particular user 104. In response to capturing the audio and outputting the audio signal 304, the beamforming module 140 may perform beamforming or spatial filtering techniques on the audio signal 304. In some embodiments, the beamforming module 140 may reduce/cancel the amount of noise and/or the amount of acoustic echo associated with the audio signal 304. This may be performed in the time domain, which may be referred to as the analysis of functions, signals, or data with respect to time. In other embodiments, the beamforming module 140 may operate in the frequency domain, which may be referred to as the analysis of functions, signals, or data with respect to frequency.

In various embodiments, the audio is captured by, and the audio signal 304 is output by, one or more microphones 108, which may include a main or primary microphone 108 and additional reference or secondary microphones 108. For instance, the voice-controlled device 106 may have multiple microphones 108 and the audio signal 304 may be analyzed for each microphone 108 that detects the audio. Therefore, the beamforming module 140 may generate multiple different beams 306 or channels, where each of the beams 306 or channels corresponds to a different one of the microphones 108. Subsequently, acoustic echo cancellation, noise reduction, and/or residual echo/noise suppression may be performed with respect to each one of the beams 306 output by the beamforming module 140. In alternate embodiments, the output of the beamforming module 140 may represent a single audio signal without any noise and/or acoustic echo that has been eliminated by the beamforming module 140.

In some embodiments, the acoustic echo within the environment 102 may be relatively strong due to the close proximity between the microphone(s) 108 and the speaker(s) 110 of the voice-controlled device 106. As a result, the beamforming module 140 may only be able to reduce, cancel, or eliminate a portion of the noise and/or acoustic echo. In certain embodiments, the amount of noise and/or acoustic echo that is reduced in the audio signal 304 may not be sufficient to allow for accurate voice activity detection (VAD) and/or automated speech recognition (ASR) of the audio signal 304 (provided that the audio signal 304 includes a user voice). In other words, after processing of the audio signal 304 by the beamforming module 140, the amount of noise and/or acoustic echo within the environment and associated with the audio signal 304 may make it difficult to detect the target voice and to determine the words or phrases that were uttered by the user 104. Therefore, the beams 306 or the resulting audio signal output by the beamforming module 140 may be analyzed by the acoustic echo cancellation module 302.

For the purposes of this discussion, beamforming may correspond to a signal processing technique for directional signal transmission or reception. In some embodiments, beamforming may be associated with a sensor array or a phased array, which may be an array of sensors (e.g., antennas) in which the relative phases of signals associated with the sensors are varied such that the pattern of the array is reinforced in a desired direction and suppressed in undesired directions. More particularly, the elements in a phased array may be combined in such a way that signals at particular angles experience constructive interference, while other signals experience destructive interference. Moreover, with respect to a signal (e.g., an audio signal), beamforming may be used at both the transmitting and receiving ends in order to achieve spatial selectivity. In further embodiments, adaptive beamforming may be utilized to detect and estimate a signal-of-interest (e.g., a particular voice) at the output of a sensor array, such as by using optimal (e.g., least-squares) spatial filtering and interference rejection. In addition, adaptive beamforming may adjust its performance with respect to differences detected within an environment. With respect to the voice-controlled device 106, beamforming may be performed for each of the multiple microphones 108 that are associated with an audio signal.

As stated above, the acoustic echo may correspond to when the audio signal 304 is output from a speaker 110 and then the corresponding audio is captured by the microphone 108. The acoustic echo may pose difficulties in detecting and interpreting the audio signal 304 for the purposes of determining an intended operation that corresponds to a voice command of the user 104. As a result, the acoustic echo cancellation module 302 may reduce, cancel, or eliminate acoustic echo that is associated with the audio signal 304. In some embodiments, the acoustic echo cancellation module 302 may reduce or cancel the acoustic echo based at least in part on an acoustic echo cancellation (AEC) reference signal 308, which may represent any type of information or signal utilized by the acoustic echo cancellation module 302 in order to reduce or cancel the amount of acoustic echo.

For the purposes of this discussion, echo may correspond to a reflection of sound that arrives at the listener some time after the direct sound was output and captured. Moreover, acoustic echo arises when sound from a speaker 110 (e.g., a loudspeaker) is captured by a microphone 108 that is in close proximity to the speaker 110 (e.g., within the same room, part of the same device, etc.). In other embodiments, acoustic echo may occur with respect to an audio signal, where the audio signal is initially transmitted and then reappears in the transmitted or received signal with some delay.

In various embodiments, the acoustic echo cancellation module 302 may cancel the acoustic echo by first capturing a far-end audio signal (e.g., the voice of a user 104). As a result, the far-end audio signal may be output by the speaker(s) 110 of the voice-controlled device 106. The microphone(s) 108 of the voice-controlled device 106 may also detect and capture the resulting direct path sound, and consequent reverberant sound as a near-end signal. In other words, acoustic echo may occur when a microphone 108 initially captures audio within a physical space and then picks up audio signals from, and output by, a speaker 110. In various embodiments, provided that the audio is a voice of a user 104, the user 104 may hear the echo of their own voice as that user 104 speaks. Moreover, the amount of acoustic echo may depend at least in part on the sensitivity of the microphone(s) 108 that are capturing the audio, the volume of the speaker 110, and/or the positions of the microphone(s) 108 and the speaker 110.

The acoustic echo cancellation module 302 may then cause the far-end audio signal to be filtered and delayed to resemble echo of the near-end audio signal. Then, the filtered far-end audio signal may be subtracted from the near-end audio signal. The resulting signal may represent audio present within the environment 102 that generally excludes any, or at least reduces the amount of, direct or reverberated sound generated by the speaker(s) 110 of the voice-controlled device 106. That is, echo cancellation may involve first recognizing the originally transmitted signal that re-appears, with some delay, in the transmitted or received signal. Once the acoustic echo is recognized, it may be removed by subtracting it from the audio signal. In some embodiments, acoustic echo cancellation may be implemented using a digital signal processor (DSP) or one or more algorithms.

The output of the acoustic echo cancellation module 302 may be an AEC (acoustic echo cancellation) output 310, which may correspond to the audio signal 304 minus the amount of acoustic echo and/or noise that was removed from the audio signal 304 by the acoustic echo cancellation module 302. That is, the AEC output 310 may represent the resulting audio signal 304, without any acoustic echo and/or noise that has been reduced, canceled, or eliminated by the beamforming module 140 and/or the acoustic echo cancellation module 302.

In the event that acoustic echo and/or noise associated with the audio signal 304 exists after acoustic echo cancellation is performed by the acoustic echo cancellation module 302, the noise reduction module 144 may reduce or cancel noise associated with the audio signal 304 and/or other noise within the environment 102. The noise may correspond to ambient or background noise, such as voices of other users 104, audio signals output by other devices within the environment 102, etc. The noise reduction module 144 may utilize one or more algorithms to reduce or cancel such noise. Various algorithms may function in the time-domain or in the frequency-domain using linear or non-linear filters. Moreover, the noise reduction module 144 may specify thresholds, dynamic or otherwise, for filtering the noise that is derived from the audio signal 304. In some embodiments, audio that falls below the threshold (e.g., noise) may be filtered out, while any audio at or above the threshold (e.g., voice or desired noise) may pass through the filter. As a result, the noise reduction module 144 may retain desired audio within the audio signal 304 and reduce, cancel, or suppress unwanted noise associated with the audio signal 304.

The noise reduction module 144 may then output an NR (noise reduction) output 312, which may represent the resulting audio signal 304 after the noise reduction module 144 has reduced or canceled at least a portion of the noise associated with the audio signal 304.

In some embodiments, the beamforming module 140, the acoustic echo cancellation module 302, and the noise reduction module 144 may not be able to cancel, suppress, or eliminate all of the acoustic echo and noise associated with the audio signal 304. As a result, at least some residual acoustic echo and noise that is associated with the original audio signal 304 may still exist. Accordingly, the residual echo/noise suppression module 146 may suppress or reduce at least a portion of such residual acoustic echo/noise. That is, the residual echo/noise suppression module 146 may suppress or reduce some or all of the remaining acoustic echo and noise that is associated with the audio signal 304. The resulting audio signal 304 that includes no acoustic echo/noise, or at least a significant decrease in the amount of acoustic echo/noise, may be output by the residual echo/noise suppression module 146 as RES (residual echo/noise suppression) output 314. In various embodiments, the residual echo/noise suppression module 146 may also consider the originally detected audio signal 304 to reduce the residual acoustic echo/noise, such as by comparing the audio signal 304 to the NR output 312. In various embodiments, residual echo/noise suppression module 146 may reduce the amount of residual echo and/or residual noise utilizing the echo cancellation and noise reduction processes described above.

Instead of using a single technique to reduce the acoustic echo and/or noise associated with a detected audio signal 304, the system 300 may utilize multiple processes to significantly reduce/suppress and possibly eliminate such acoustic echo and/or noise. In other words, the system 300 may achieve a much better reduction/suppression of acoustic echo/noise. Therefore, the beamforming module 140, the acoustic echo cancellation module 302, the noise reduction module 144, and the residual echo/noise suppression module 146 may incrementally reduce, suppress, or cancel both acoustic echo and noise associated with the detected audio signal 304. The resulting audio signal (RES output 314) may represent an enhanced audio signal that may be processed using VAD and/or ASR. That is, the voice-controlled device 106 may detect a voice of the user 104 and then determine the specific words or phrases that were uttered by the user 104. In response to identifying those words or phrases, the voice-controlled device 106 may perform a corresponding operation.

Provided that the beamforming module 140 output multiple different beams 306, the voice-controlled device (e.g., a VAD module) may determine which one of the beams 306 includes the target voice. In some embodiments, more than one of the beams 306 may correspond to the target voice, but one of those beams 306 may be associated with the target voice more than others. Upon selecting the beam 306 that corresponds to the target voice, the voice-controlled device may perform ASR with respect to the selected beam 306 in order to determine any voice commands uttered by the user 104.

Figure 4:
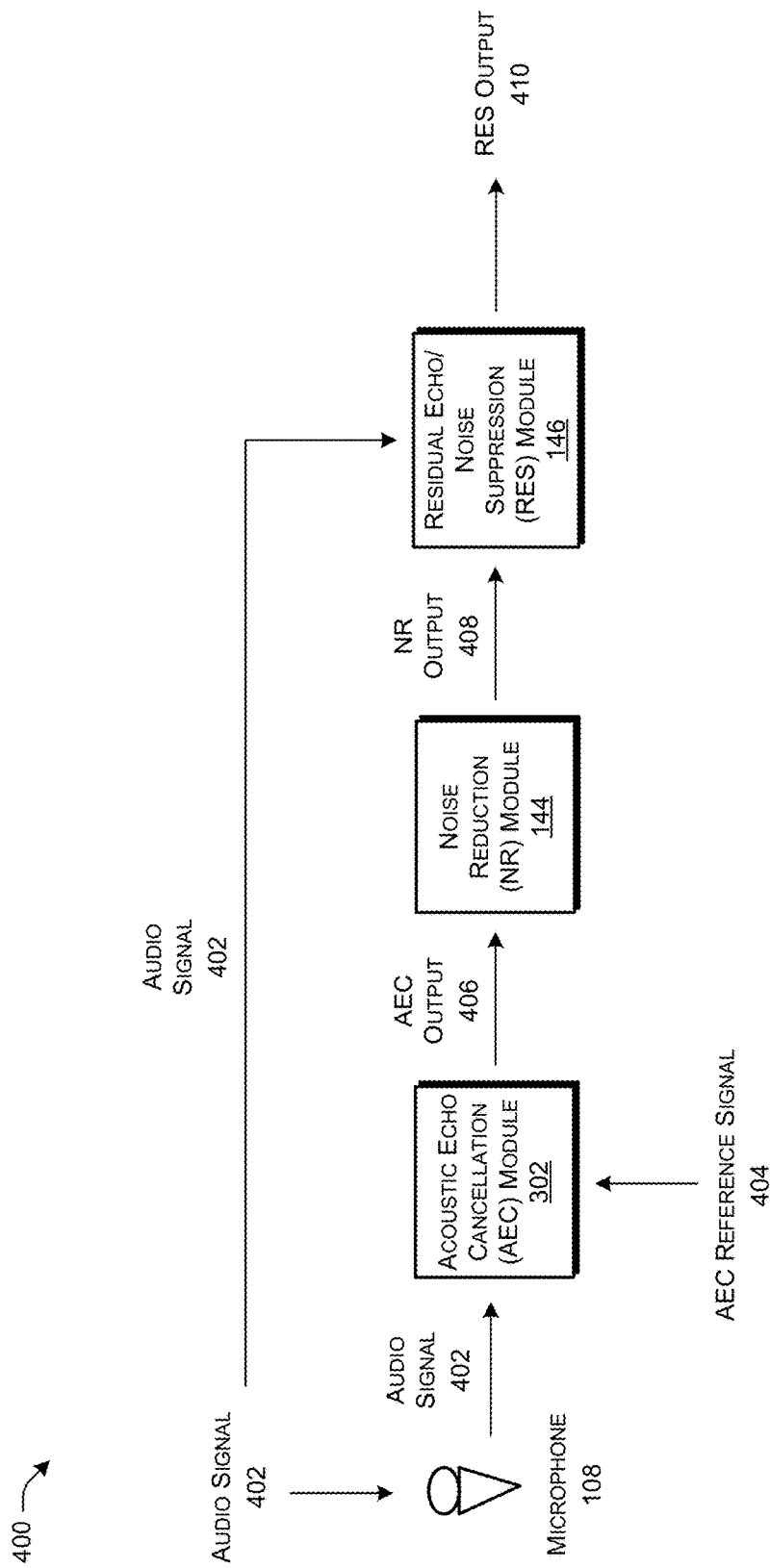
FIG. 4 shows an illustrative system for performing acoustic echo cancellation, noise reduction, and residual echo/noise suppression with respect to an audio signal.

FIG. 4 shows an illustrative system 400 for reducing or eliminating acoustic echo and noise associated with an audio signal that corresponds to audio that is captured within an environment. In various embodiments, the processes illustrated in the system 400 of FIG. 4 may be performed by the voice-controlled device 106. Moreover, as shown, the system 400 may include one or more microphones 108, the acoustic echo cancellation module 302, the noise reduction module 144, and the residual echo/noise suppression module 146. The processes illustrated in FIG. 4 may also be the same as those illustrated in FIG. 3, with the exception that the beamforming module 140 is not included in the system 400 illustrated in FIG. 4.

In various embodiments, the microphone 108 may capture audio within the environment 102. Instead of the beamforming module 140 performing beamforming or spatial filtering with respect to an audio signal 402 associated with the captured audio, the acoustic echo cancellation module 302 may cancel, suppress, reduce, or eliminate acoustic echo associated with the audio signal 402, as discussed above in additional detail with respect to FIG. 3. The audio signal 402 with a reduced amount of acoustic echo may be output by the acoustic echo cancellation module 302 as AEC (acoustic echo cancellation) output 406. In some embodiments, the AEC output 406 may be based at least in part on an AEC reference signal 404, which may the same as, or similar to, the AEC reference signal 308.

Moreover, the noise reduction module 144 may process the AEC output 406 for the purpose of reducing or canceling noise associated with the audio signal 402. As result, the audio signal 402 with a reduced amount of noise may be output as NR (noise reduction) output 408. That is, the NR output 408 may represent the audio signal 402 without the acoustic echo and noise reduced, cancelled or suppressed by the acoustic echo cancellation module 302 and the noise reduction module 144, respectively.

If any residual acoustic echo or noise associated with the audio signal 402 remains, the residual echo/noise suppression module 146 may reduce, cancel, or suppress such acoustic echo and noise associated with the audio signal 402. The audio signal 402 without the reduced/canceled acoustic echo and noise may be represented as RES (residual echo/noise suppression) output 410, which may be similar to RES output 314, as shown in FIG. 3. In some embodiments, the residual echo/noise suppression module 146 may also consider the initial audio signal 402 when canceling or suppressing the residual acoustic echo and noise.

Therefore, the system 400 illustrated in FIG. 4 may reduce, cancel, or suppress acoustic echo and noise from a detected audio signal 402, but without first performing beamforming or spatial filtering with respect to the audio signal 402. Since the beamforming module 140 is not included in this system 400, acoustic echo and noise associated with the audio signal 402 may be canceled/suppressed by the voice-controlled device using a reduced amount of resources (e.g., power, storage, bandwidth, etc.).

Figure 5:
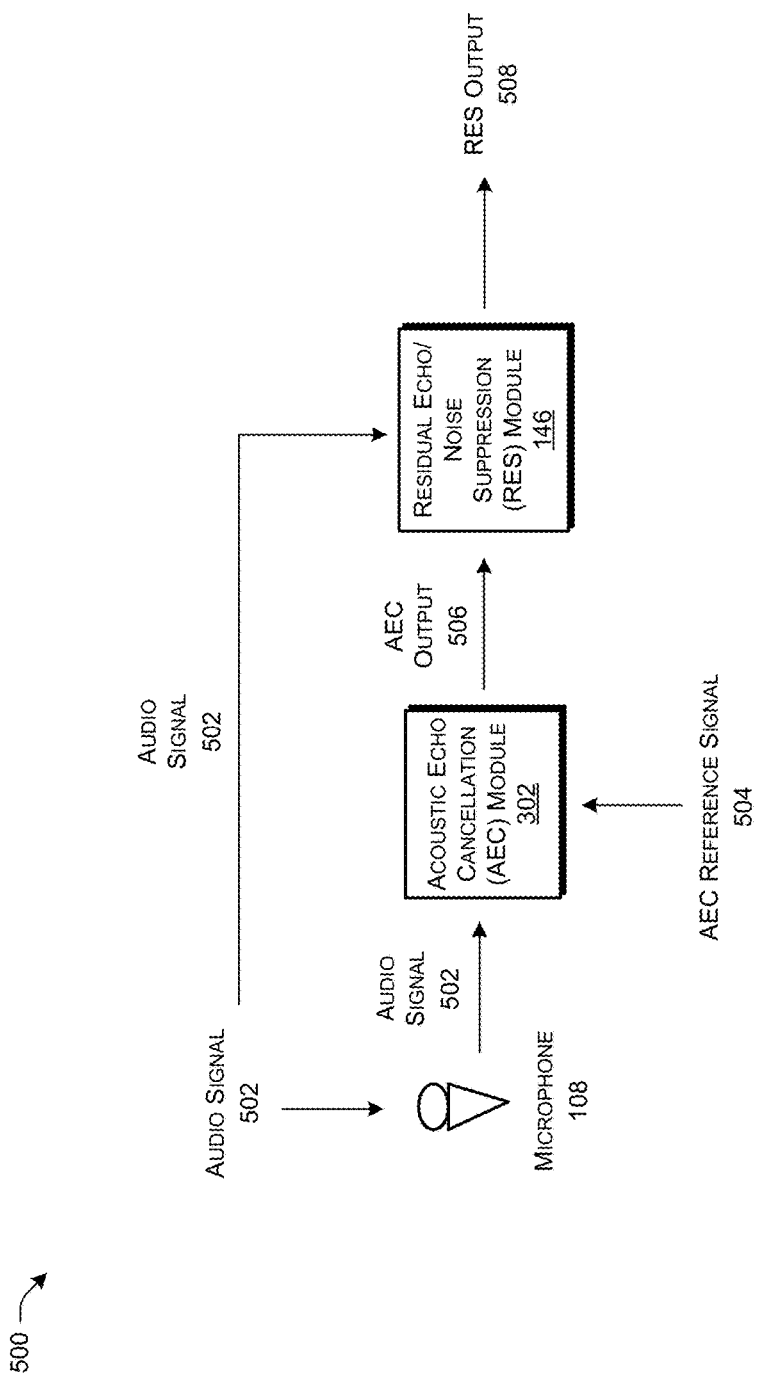
FIG. 5 shows an illustrative system for performing acoustic echo cancellation and residual echo suppression with respect to an audio signal.

FIG. 5 shows an illustrative system 500 for reducing or eliminating acoustic echo associated with an audio signal that is associated with an environment. In various embodiments, the processes illustrated in the system 500 of FIG. 5 may be performed by the voice-controlled device 106. Moreover, as shown, the system 500 may include one or more microphones 108, the acoustic echo cancellation module 302 and the residual echo/noise suppression module 146. The processes illustrated in FIG. 5 may also be the same as those illustrated in FIG. 3, with the exception that the beamforming module 140 and the noise reduction module 144 are not included in the system 500 illustrated FIG. 5.

In various embodiments, the microphone 108 may capture audio within the environment 102. Instead of the beamforming module 140 performing beamforming or spatial filtering with respect to an audio signal 502 associated with the captured audio, the acoustic echo cancellation module 302 may cancel, suppress, reduce, or eliminate acoustic echo associated with the audio signal 502, as discussed above in additional detail with respect to FIG. 3. The audio signal 502 with a reduced amount of acoustic echo may be output by the acoustic echo cancellation module 302 as AEC (acoustic echo cancellation) output 506. In some embodiments, the AEC output 506 may be based at least in part on an AEC reference signal 504, which may the same as, or similar to, the AEC reference signal 308.

In response to the acoustic echo cancellation module 302 reducing, canceling, or suppressing acoustic echo associated with the audio signal 502, the residual echo/noise suppression module 146 may reduce, cancel, or suppress any residual acoustic echo associated with the audio signal 502. The audio signal 502 without the suppressed/canceled acoustic echo may be represented as RES (residual echo suppression) output 508, which may be similar to RES output 314, as shown in FIG. 3. In some embodiments, the residual echo/noise suppression module 146 may also consider the originally detected audio signal 502 when canceling or suppressing the residual acoustic echo associated with the audio signal 502.

Therefore, the system 500 illustrated in FIG. 5 may reduce, cancel, or suppress acoustic echo from a detected audio signal 502, but without first performing beamforming or spatial filtering with respect to the audio signal 502, and without the noise reduction module 144 reducing noise associated with the audio signal 502. This system 500 may be utilized in devices where there may be insufficient resources, storage, or bandwidth to perform noise reduction with respect to the audio signal 502.

Figure 6:
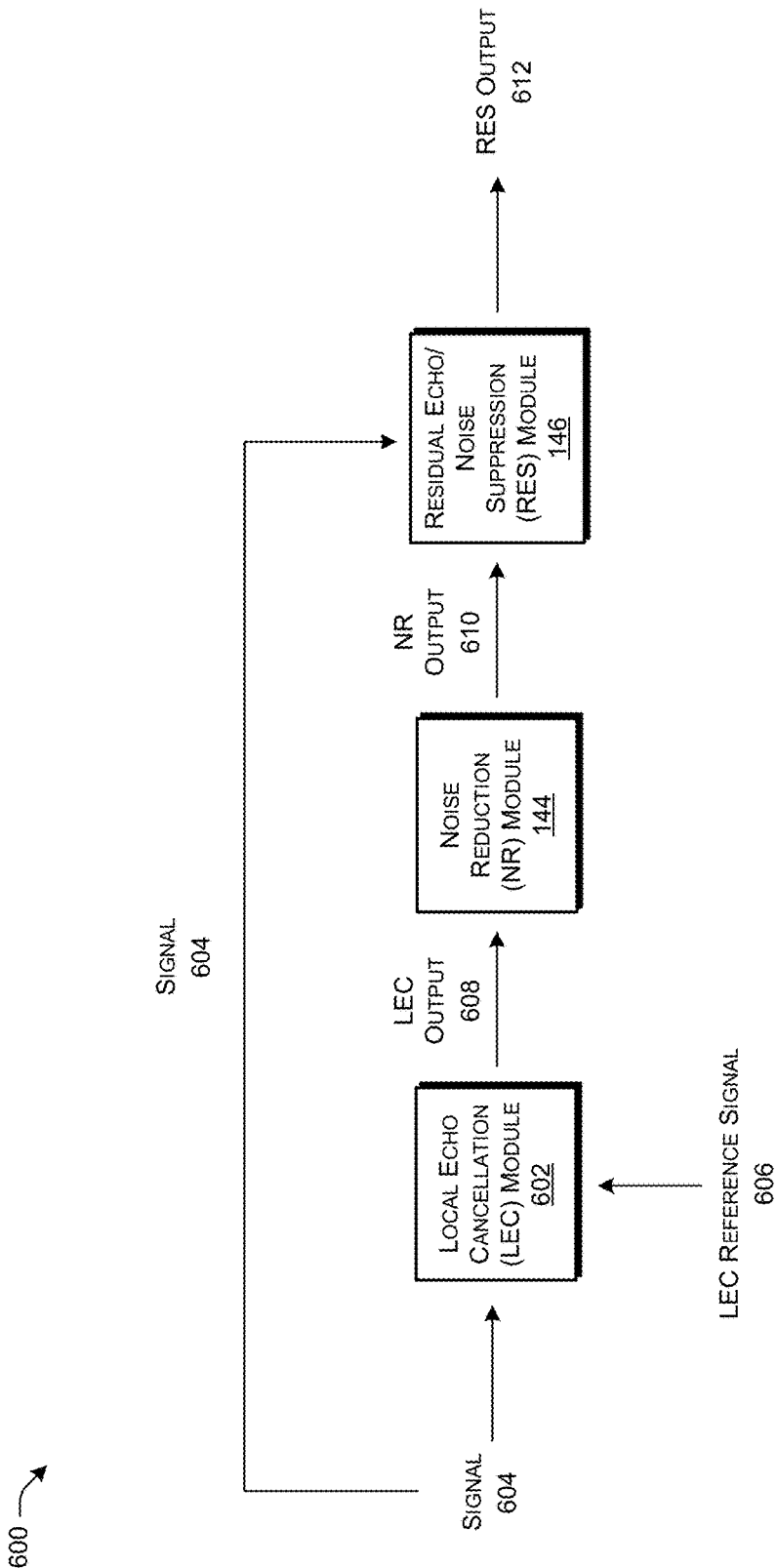
FIG. 6 shows an illustrative system for performing local echo cancellation (or electric echo cancellation, or hybrid echo cancellation), noise reduction, and residual echo/noise suppression with respect to a receive-path input signal.

FIG. 6 shows an illustrative system 600 for reducing or eliminating electrical echo and noise associated with a receive-path input signal. In various embodiments, the processes illustrated in the system 600 of FIG. 6 may be performed by the voice-controlled device 106. Moreover, as shown, the system 600 may include a local echo cancellation module 602, the noise reduction module 144, and the residual echo/noise suppression module 146.

For the purposes of this discussion, local echo may correspond to hybrid echo or electrical echo that is generated by a telephone network through the reflection of electrical energy. Various telephone networks have local loops that are two-wire circuits, while transmission facilities typically utilize four-wire circuits. Therefore, the difference in the circuits associated with the local loops and the transmission facilities may cause electrical leakage, which corresponds to the local echo. In other words, as an electrical signal is transmitted via a telephone network, transitions in the network may cause latency of the electrical signal and corresponding local echo. In other embodiments, local echo may correspond to the display or return of sent data at, or to, the sending end of a transmission. For instance, local echo may refer to a situation where the sending device itself displays the previously sent data.

As shown, the local echo cancellation module 602 may process a signal 604 (e.g., an electrical signal) for the purpose of reducing or canceling local echo with respect to that signal 604. The local echo cancellation module 602 may utilize any type of data or information to reduce or cancel such local echo, which may be represented by LEC (local echo cancellation) reference signal 606. In response, the local echo cancellation module 602 may output LEC output 608, which may correspond to the amount of local echo that has been reduced or canceled, or the signal 604 without the local echo that has been reduced or canceled by the local echo cancellation module 602.

Subsequently, the noise reduction module 144 may reduce or suppress any amount of noise that is associated with the signal 604, as discussed above with respect to FIGS. 3-5. An NR (noise reduction) output 610 output by the noise reduction module 144 may correspond to the amount of noise that has been reduced or canceled, or the signal 604 without the local echo and noise that has been reduced or canceled by the local echo cancellation module 602 and the noise reduction module 144, respectively.

In various embodiments, any residual local echo and noise may be suppressed by the residual echo/noise suppression module 146. The signal 604 without any local echo or noise, or a very limited amount of local echo or noise, may be output as RES (residual echo suppression) output 612. In various embodiments, the residual echo/noise suppression module 146 may generate the RES output 612 based at least in part on the originally detected signal 604. Therefore, the system 600 may reduce, cancel, or suppress the amount of local echo (as opposed to acoustic echo) and noise associated with a detected electrical signal 604.

Figure 7:
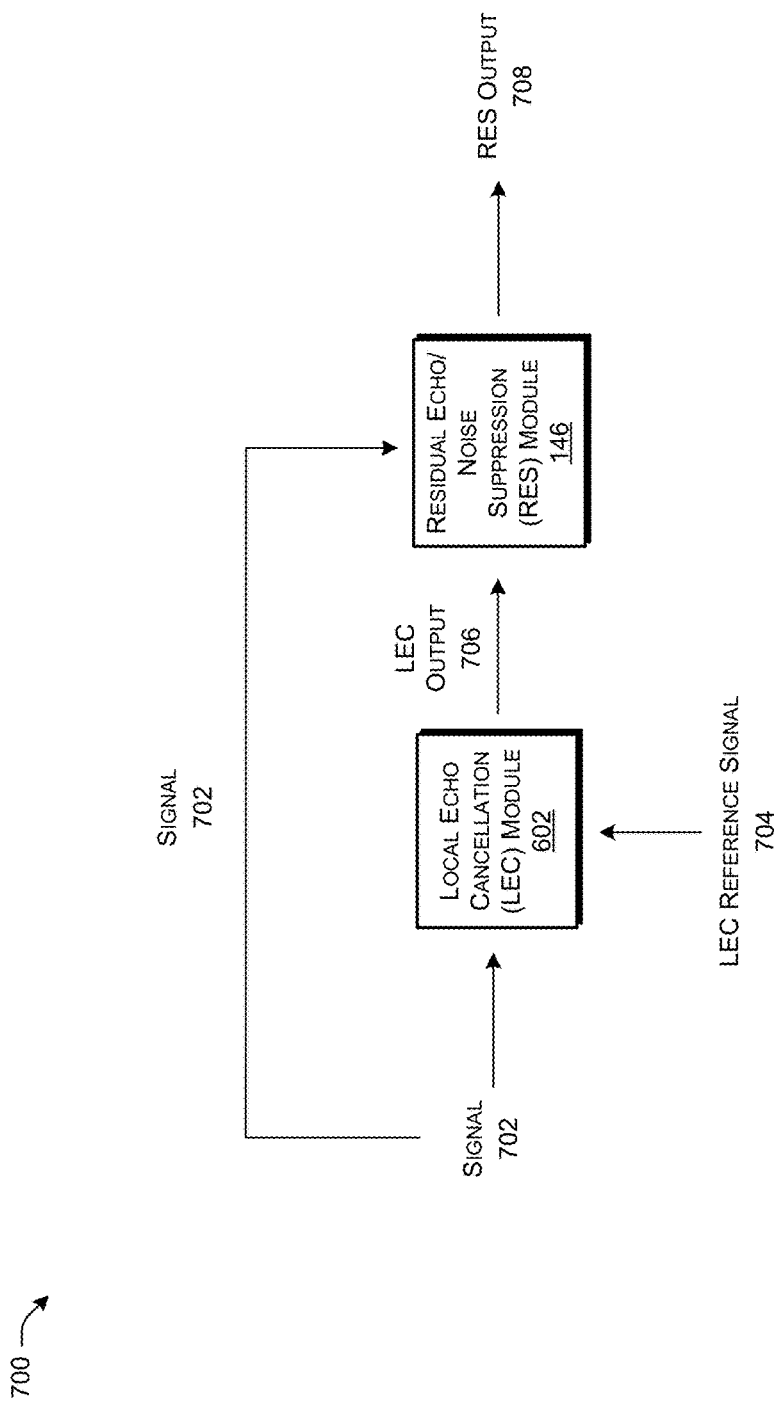
FIG. 7 shows an illustrative system for performing local echo cancellation (or electric echo cancellation, or hybrid echo cancellation) and residual echo suppression with respect to a receive-path input signal.

FIG. 7 shows an illustrative system 700 for reducing or eliminating local echo associated with an electrical signal. In various embodiments, the processes illustrated in the system 700 of FIG. 7 may be performed by the voice-controlled device 106. Moreover, as shown, the system 700 may include the local echo cancellation module 602 and the residual echo suppression module 146. The processes illustrated in FIG. 7 may also be the same as those illustrated in FIG. 6, with the exception that the noise reduction module 144 is not included in the system 700 illustrated in FIG. 7.

As shown, the local echo cancellation module 602 may process a signal 702 (e.g., an electrical signal) for the purpose of reducing or canceling local echo with respect to that signal 702. The local echo cancellation module 602 may utilize any type of data or information to reduce or cancel such local echo, which may be represented by LEC (local echo cancellation) reference signal 704. In response, the local echo cancellation module 602 may output LEC output 706, which may correspond to the amount of local echo that has been reduced or canceled, or the signal 702 without the local echo that has been reduced or canceled by the local echo cancellation module 602.

In various embodiments, any residual local echo may be suppressed by the residual echo/noise suppression module 146. The signal 702 without any local echo, or a very limited amount of local echo, may be output as RES (residual echo suppression) output 708. In various embodiments, the residual echo/noise suppression module 146 may generate the RES output 708 based at least in part on the originally detected signal 702. Therefore, the system 700 may reduce, cancel, or suppress the amount of local echo (but not noise) associated with a detected electrical signal 702. This system 700 may be utilized in devices where there may be insufficient resources, storage, or bandwidth to perform noise reduction with respect to the signal 702.

Figure 8:
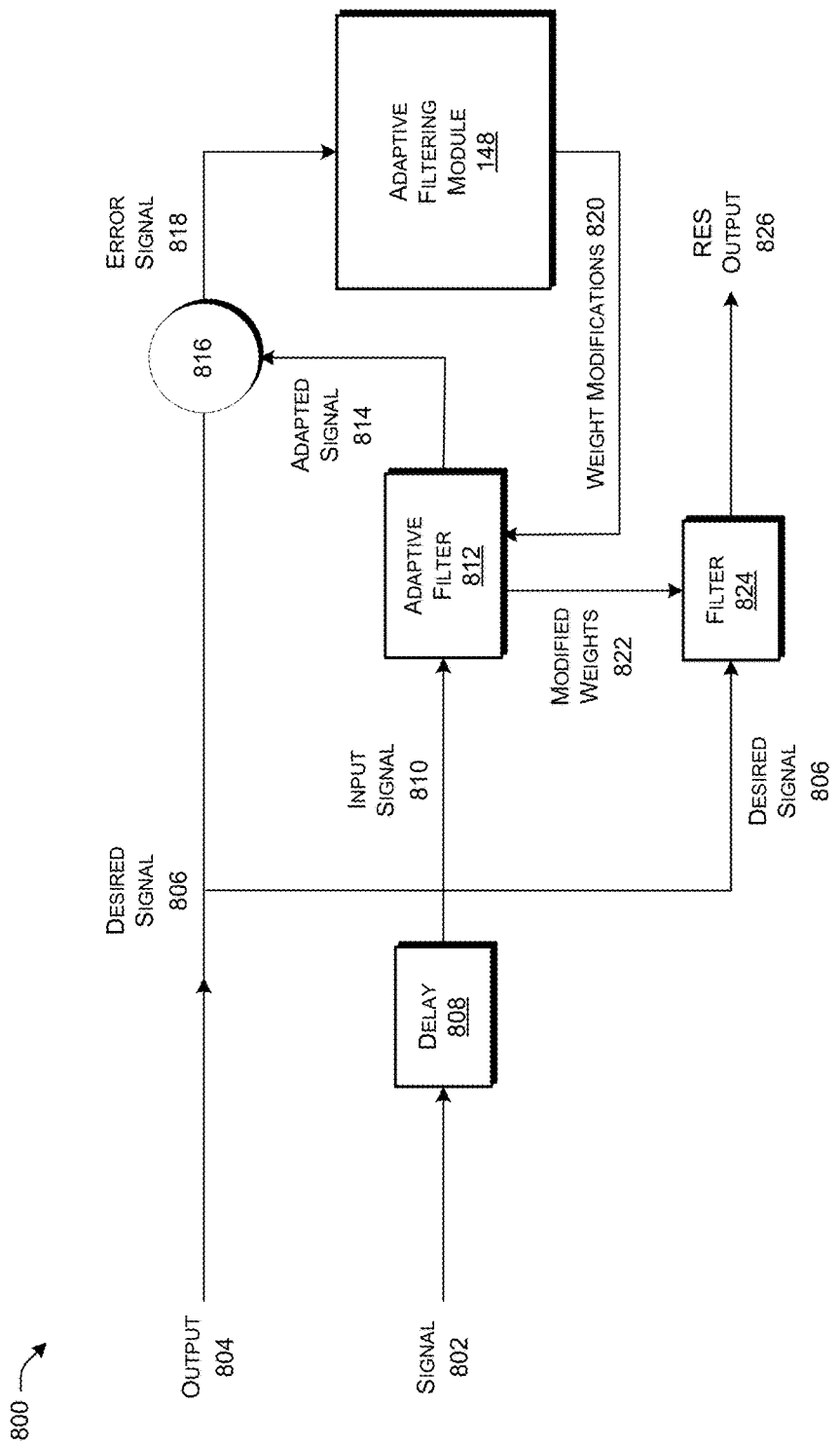
FIG. 8 shows an illustrative system for reducing noise and echo with respect to a signal utilizing at least one adaptive filter.

FIG. 8 shows an illustrative system 800 for reducing, canceling, or suppressing acoustic echo and/or noise associated with a signal utilizing an adaptive filter. More particularly, the weights of the adaptive filter may be updated utilizing one or more algorithms, such as the normalized least means square (NLMS) algorithm or the total least squares (TLS) algorithm. That is, instead of merely freezing or updating the adaptive filter, as performed in conventional adaptive filtering systems, the system 800 may dynamically adjust the adaptive filter weights after the adaptation. In various embodiments, the processes illustrated in FIG. 8 may be performed by the voice-controlled device 106 and, in particular, the residual echo/noise suppression module 146 and/or the adaptive filtering module 148.

As discussed above with respect to FIGS. 3-7, a microphone 108 may detect audio that is associated with an audio signal (e.g., audio signal 304, audio signal 402, and/or audio signal 502) or a receive-path input signal (e.g., an electrical signal, such as signal 604 and/or signal 702) may be detected. In various embodiments, such signals may be referred to as signal 802, as shown in FIG. 8. Moreover, an output 804 may correspond to a NR (noise reduction) output (e.g., NR output 312, NR output 408, or NR output 610), an AEC (acoustic echo cancellation) output (e.g., AEC output 506), or an LEC (local echo cancellation) output (e.g., LEC output 706). Therefore, output 804 may represent the residual amount of echo and/or noise that is to be processed by the residual echo/noise suppression module 146 and may also be referred to as a desired signal 806.

In response to the microphone 108 detecting the audio and generating the signal 802, the system 800 may cause a delay 808 with respect to the signal 802. The delay 808 is instituted in order to synchronize or align the signal 802 and the output 804. More particularly, acoustic echo cancellation, local echo cancellation, and/or noise reduction may be performed with respect to the signal 802 in order to reduce, cancel, or suppress acoustic echo, local echo, and/or noise, respectively, associated with the signal 802. As a result, the signal 802 may be delayed to compensate for the time it takes to perform the above processes. In other words, the delay 808 associated with the signal 802 may correspond to the time associated with canceling, reducing, or suppressing the echo and/or noise associated with the signal 802. After the delay 808, the signal 802 and the output 804 may be aligned or synchronized.

Following the delay 808, the signal 802, which may then be referred to as an input signal 810, may be synchronized with the desired signal 806 and may be processed by an adaptive filter 812. For the purposes of this discussion, the adaptive filter 812 may refer to a filter that self-adjusts its transfer function according to one or more algorithms that may be driven by an error signal. In certain embodiments, the adaptive filter 812 may utilize a cost function, which may be a criterion associated with the optimum performance of the adaptive filter 812. The cost function may be used to feed an algorithm associated with the adaptive filter 812, which may determine how to modify a filter transfer function to minimize the cost on the next iteration (e.g., processing of additional audio signals).

In various embodiments, the adaptive filter 812 is content (e.g., frequency) dependent, meaning that the adaptive filter 812 filters the input signal 810 based at least in part on the content or frequency of the signal. For instance, if the adaptive filter 812 determines that the input signal 810 includes a target voice, the adaptive filter 812 may then allow the input signal 810 to pass through without performing any attenuation with respect to the input signal 810. On the other hand, if the adaptive filter 812 detects echo (either acoustic or local echo) and/or noise associated with the input signal 810, the adaptive filter 812 may then filter out (e.g., cancel, suppress, remove, etc.) the echo and/or noise utilizing one or more algorithms (e.g., the NLMS algorithm, the TLS algorithm, etc.). As a result, the adaptive filter 812 may be configured to bypass target voice signals while filtering out residual echo and/or noise associated with the input signal 810.

In certain embodiments, the adaptive filter 812 may output an adapted signal 814, which may represent the input signal 810 that includes any detected voice without any echo and/or noise that has been filtered out by the adaptive filter 812. Moreover, a signal determination module 816 may generate an error signal 818 based at least in part on the desired signal 806 and the adapted signal 814. In particular, the signal determination module 816 may determine the error signal 818 by determining the difference between the desired signal 806 and the adapted signal 814. Moreover, the error signal 818 may correspond to an amount of residual echo and/or noise associated with the initially detected signal 802.

The adaptive filtering module 148 may then determine any weight modifications 820 with respect to the one or more algorithms utilized by the adaptive filter 812 based at least in part on the error signal 818. In particular, based on the error signal 818 that is determined, various weights (e.g., coefficients) of the adaptive filter 812 may be updated or modified for the purpose of more accurately processing additional signals. In some embodiments, the adaptive filtering module 148 may utilize a particular threshold for determining whether, and to what extent, the weights of the algorithm(s) should be modified. For instance, if an energy ratio between the output 804 and the signal 802 meets or exceeds the threshold, then the weights may be modified (e.g., increased). However, if the energy ratio is less than the threshold, the adaptive filtering module 148 may modify the weights in a different manner (e.g., decrease weights). Therefore, the weights of the algorithm(s) may be adjusted in order to further reduce residual echo and/or noise associated with the signal 802 and subsequent signals detected within the environment 102.

In various embodiments, the adaptive filtering module 148 may pass the weight modifications 820 to the adaptive filter 812. As a result, the adaptive filter may adjust the weights/coefficients of the algorithm(s) (e.g., modified weights 822) based at least in part on the weight modifications 820. Moreover, in order to process additional input signals, a copy of the modified weights 822 may be passed to a filter 824 that is different from the adaptive filter 812. Therefore, the filter 824 may include a current and updated copy of the modified weights 822. Based at least in part on the desired signal 806 and the modified weights 822 provided by the adaptive filter 812, the filter 824 may suppress, reduce, or cancel any residual echo and/or noise that results after performing beamforming, echo cancellation (either acoustic or local), and/or noise reduction with respect to the originally detected signal. That is, the filter 824 may filter out residual echo and/or noise associated with the output 804. The filter 824 may then output an RES (residual echo suppression) output 826, which may correspond to the amount of echo and/or noise reduced from the signal 802 or the signal 802 without the suppressed/canceled echo and/or noise.

As mentioned above, an algorithm (e.g., the NLMS algorithm) may be utilized to perform the adaptive filtering of the input signal 810. Moreover, various weights (e.g., coefficients) of the algorithm may be modified or updated by the adaptive filtering module 148. In various embodiments, an unknown system h(n) is to be identified and the adaptive filter 812 may attempt to adapt the filter ĥ(n) such that the filter ĥ(n) is as close as possible to h(n), while using observable signals. Such observable signals may include the input signal 810 x(n), the desired signal 806 d(n), and the error signal 818 e(n). In some embodiments, although the input signal 810 x(n), the desired signal 806 d(n), and the error signal 818 e(n) may be observable, the system h(n) may not be directly observable. Accordingly, the algorithm associated with the adaptive filter 812 may be utilized to mimic a desired filter by determining the filter coefficients and may relate to producing the least means squares of the error signal 818 e(n), which may correspond to the difference between the desired signal 806 d(n) and the input signal 810 x(n).

The following is an example of the above algorithm, which may be used to modify the weighs/coefficients:

Initialization: $\hat{h}(0)=0$

Computation: For $n=0,1,2,\ldots$ $x(n)=[x(n),x(n-1),\ldots,x(n-p+1)]^T$ $e(n)=d(n)-\hat{h}^H(n)x(n)$ $$\hat{h}(n+1) = \hat{h}(n) + \frac{\mu e^*(n)x(n)}{x^H(n)x(n)}$$

Where p may correspond to the filter order, where μ may correspond to a step size, and where $\hat{h}^H(n)$ may denote the Hermitian transpose of $\hat{h}(n)$.

Accordingly, by modifying the weights associated with the adaptive filter 812 after adaptation of the input signal 810, and by copying the modified weights 822 to the filter 824, the filter 824 may reduce, cancel, or suppress both residual echo and residual noise associated with the signal 802. As a result, the target voice may be enhanced and cause the voice to have a high quality due to the absence of acoustic echo and/or noise. Moreover, the computation complexity of this residual echo/noise suppression approach may be low and it may be integrated with other beamforming, acoustic echo cancellation, and noise reduction techniques, as discussed above with respect to FIGS. 3-7.

Figure 9:
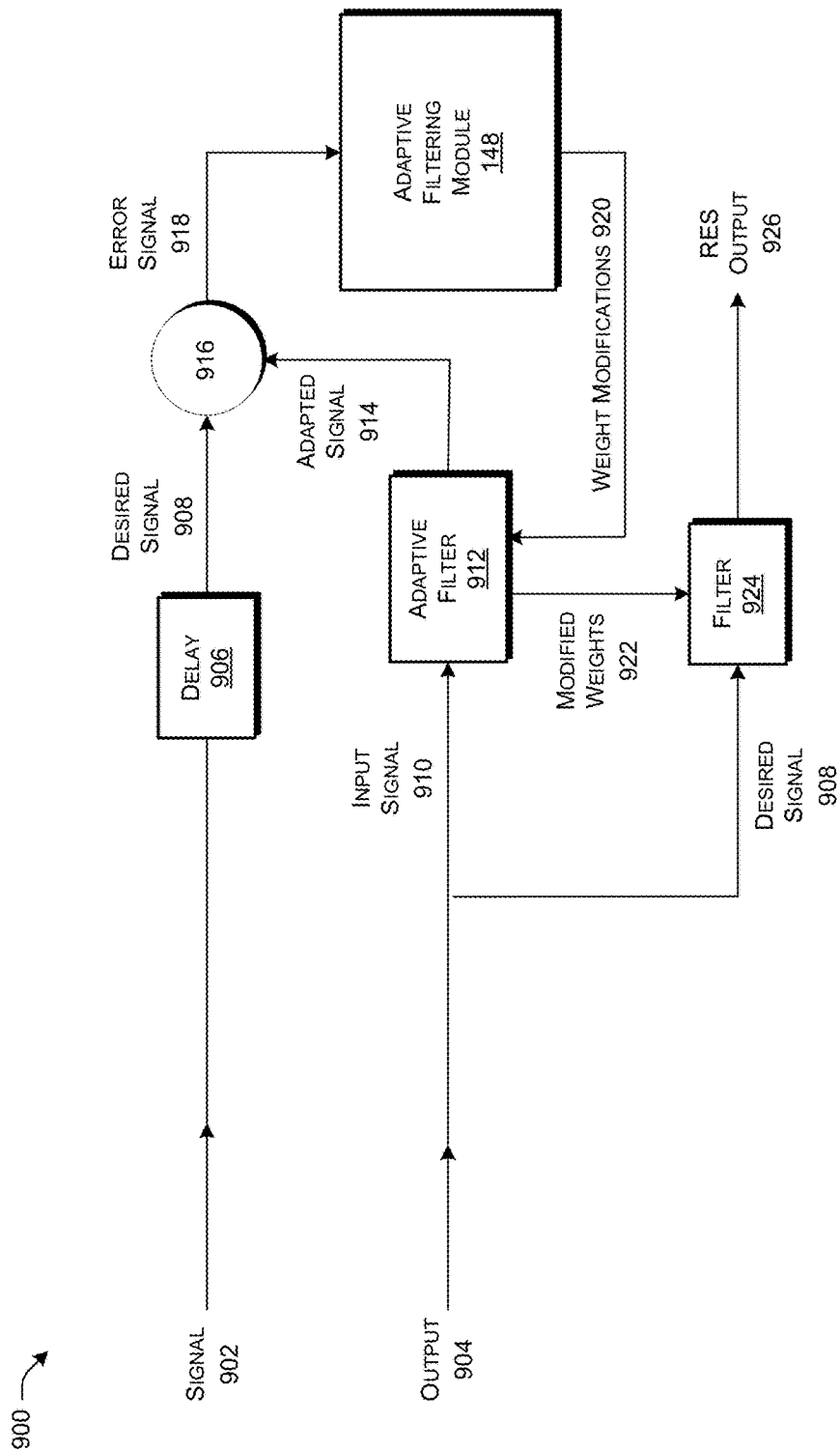
FIG. 9 shows an illustrative system for reducing noise and echo with respect to a signal utilizing at least one adaptive filter.

FIG. 9 shows an illustrative system 900 for reducing, canceling, or suppressing acoustic echo and/or noise associated with a detected signal utilizing an adaptive filter. In particular, the system 900 illustrated in FIG. 9 is similar to that illustrated in FIG. 8, except that the output 904 (e.g., output 804), instead of the signal 902 (e.g., signal 802), is processed by the adaptive filter (e.g., adaptive filter 812). As stated above, the processes described with respect to FIG. 9 may be performed by the voice-controlled device 106 and, in particular, the residual echo/noise suppression module 146 and/or the adaptive filtering module 148.

In various embodiments, a signal 902 (e.g., an audio signal, an electrical signal, etc.) may be determined. In addition, an output 904 may also be determined, where the output 904 may correspond to a NR (noise reduction) output (e.g., NR output 312, NR output 408, and/or NR output 610), an AEC (acoustic echo cancellation) output (e.g., AEC output 506), or an LEC (local echo cancellation) output (e.g., LEC output 706). The signal may be delayed 906 due to any processing (e.g., beamforming, echo cancellation, noise reduction, etc.) that is being performed with respect to the initially detected signal. Accordingly, the delay may reflect an amount of time associated with such processing such that the signal 902 and the output 904 are aligned and synchronized. After the delay 906, the signal 902 may be referred to as a desired signal 908 and the output 904 may be referred to the input signal 910 that is to be processed by an adaptive filter 912. Moreover, following the delay 906, the desired signal 908 and the input signal 910 may be synchronized.

The adaptive filter 912 may filter the input signal in order to detect a voice included within the input signal and then allow that detected voice to pass though. In contrast, any echo (acoustic or local echo) and/or noise may be detected and filtered out by the adaptive filter 912. The resulting output may be referred to as an adapted signal 914. Consequently, a signal determination module 916 may determine an error signal 918 based at least in part on the difference between the desired signal 908 and the adapted signal 914.

Moreover, the adaptive filtering module 148 may then determine any weight modifications 920 associated with the adaptive filter 912 based at least in part on the error signal 918. That is, the adaptive filtering module 148 may adjust or modify any weights associated with the adaptive filter 912, or an algorithm associated with the adaptive filter 912.

A copy of the modified weights 922 may then be passed to a filter 924, which may suppress or cancel any residual echo and/or noise based at least in part on the modified weights 922 and the desired signal 908. The signal without any residual echo and/or noise, or at least a significant decrease in residual echo and/or noise, may be output as RES (residual echo suppression) output 926. As noted above with respect to FIG. 8, the system 900 may remove (or at least decrease) echo and noise from a signal (e.g., an audio signal) for the purpose of enabling VAD and ASR with respect to the resulting signal.

Figure 10:
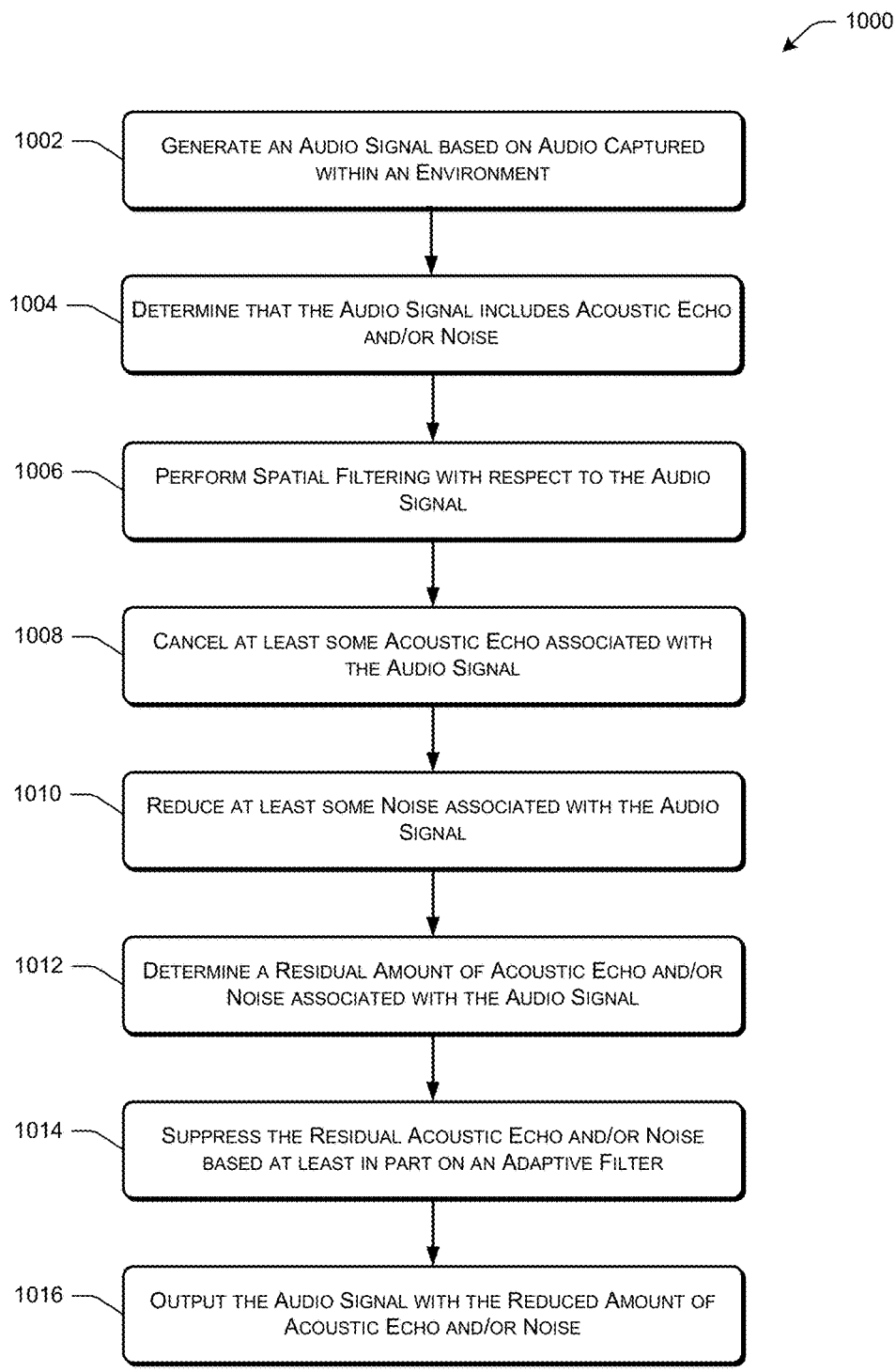
FIG. 10 depicts a flow diagram of an example process for reducing noise and echo with respect to a signal, which may be performed by the voice-controlled device of FIG. 1, to increase the efficacy of ASR by the device.

FIG. 10 depicts a flow diagram of an example process 1000 for reducing, canceling, or suppressing acoustic echo and/or noise associated with a detected audio signal. The voice-controlled device 106, the remote computing resources 118, other computing devices or a combination thereof may perform some or all of the operations described below.

The process 1000 is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Block 1002 illustrates generating an audio signal based on audio captured within an environment. More particularly, a microphone 108 of the voice-controlled device 106 may capture audio within the environment 102, and further generate an audio signal within the environment, where the audio signal may include a voice command from a user or other audio signal. In certain embodiments, the audio signal may instead be an electrical signal, as described above with respect to FIGS. 6 and 7.

Block 1004 illustrates determining that the audio signal includes acoustic echo and/or noise. For instance, the voice-controlled device 106 may determine that the audio signal includes ambient or background noise, or that the microphone 108 of the voice-controlled device 106 is capturing a voice that is output by the speaker(s) 110 of the voice-controlled device, thus causing an amount of unwanted acoustic echo.

Block 1006 illustrates performing spatial filtering with respect to the audio signal. In particular, the beamforming module 140 may determine which one of the microphones 108 of the voice-controlled device 106 includes a target voice, while also possibly reducing acoustic echo and/or noise associated with the audio signal.

Block 1008 illustrates canceling at least some acoustic echo associated with the audio signal. For example, provided that acoustic echo exists within the environment 102, the echo cancellation module 142 may cancel some (or all) of the acoustic echo associated with the audio signal.

Block 1010 illustrates reducing at least some of the noise associated with the audio signal. More particularly, provided that noise other than the target voice exists within the environment 102, the noise reduction module 144 may reduce some (or all) of the noise associated with the audio signal and present within the environment 102.

Block 1012 illustrates determining a residual amount of acoustic echo and/or noise associated with the audio signal. That is, in response to acoustic echo and noise being canceled and reduced by the echo cancellation module 142 and the noise reduction module 144, respectively, an amount of residual acoustic echo and/or noise may be determined.

Block 1014 illustrates suppressing the residual acoustic echo and/or noise based at least in part on an adaptive filter. In some embodiments, the echo cancellation module 142 and the noise reduction module 144 may be unable to reduce or cancel all of the acoustic echo and noise associated with the audio signal. As a result, the residual echo/noise suppression module 146 may suppress the residual acoustic echo and/or noise. The residual acoustic echo and/or noise may be suppressed utilizing an adaptive filter that is associated with one or more algorithms. Moreover, the adaptive filtering module 148 may modify or adjust weights associated with these algorithms after adaptation of the audio signal. A copy of the modified weights may then be passed on to a second, different filter.

Block 1016 illustrates outputting the audio signal with the reduced amount of acoustic echo and/or noise. More particularly, the second filter that receives a copy of the modified weights may then output an audio signal with a reduced amount of the residual acoustic echo and noise. As a result, and with a limited amount of acoustic echo and noise associated with the audio signal, VAD and ASR may be performed with respect to the audio signal.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
  memory;
  one or more processors;
  one or more computer-executable instructions stored in the memory and
  executable by the one or more processors to:
    perform spatial filtering on an audio signal generated by multiple microphones,
    the audio signal being associated with noise and an acoustic echo;

reduce at least a portion of the acoustic echo associated with the audio signal and reduce at least a portion of the noise associated with the audio signal to generate an output signal;

determine residual acoustic echo associated with the output signal, the residual acoustic echo representing acoustic echo that has not been removed from the audio signal;

determine residual noise within the output signal, the residual noise representing noise that has not been removed from the audio signal; and reduce the residual acoustic echo or the residual noise associated with the output signal by:

synchronizing the audio signal and the output signal by delaying the audio signal to account for an amount of time to reduce the residual acoustic echo or the residual noise from the output signal, wherein delaying the audio signal results in a delayed audio signal;

removing, by an adaptive filter, the acoustic echo and the noise to generate an adapted signal;

determining an error signal based at least in part on a difference between the delayed audio signal and the adapted signal;

determining, based at least in part on the error signal, one or more weight modifications to the adaptive filter; and reducing, by a second filter, at least one of the residual acoustic echo or the residual noise from the output signal based at least in part on respective values of the one or more weight modifications.

2. The system as recited in claim 1, wherein the one or more computer-executable instructions are further executable by the one or more processors to reduce the at least one of the residual acoustic echo or the residual noise from the output signal based at least in part on dynamically modifying one or more weights of an algorithm associated with the adaptive filter to generate modified one or more weights, the modified one or more weights of the algorithm being used to identify a voice represented within a subsequent audio signal.

3. The system as recited in claim 2, wherein the one or more computer-executable instructions are further executable by the one or more processors to:
detect speech represented within the audio signal; and
in response to detecting the speech represented within the audio signal, determine one or more words or phrases associated with the speech.

4. The system of claim 1, wherein the system is associated with a voice-controlled device that includes a speaker, and wherein the acoustic echo is based at least in part on sound that is output by the speaker.

5. A method comprising:
under control of one or more processors of a computing device,
generating an audio signal from sound, the audio signal being associated with an acoustic echo and noise;
reducing at least a portion of the acoustic echo associated with the audio signal and reducing at least a portion of the noise associated with the audio signal to generate an output signal;
determining that the output signal is associated with one or more of residual acoustic echo or residual noise after the reducing of the acoustic echo and the reducing of the noise from the audio signal; and reducing the residual acoustic echo or the residual noise from the output signal by:

synchronizing the audio signal and the output signal by delaying the audio signal to account for an amount of time to reduce the residual acoustic echo or the residual noise from the output signal, wherein delaying the audio signal results in a delayed audio signal;

removing, by an adaptive filter, the acoustic echo and the noise to generate an adapted signal;

determining an error signal based at least in part on a difference between the delayed audio signal and the adapted signal;

determining, based at least in part on the error signal, one or more weight modifications to the adaptive filter; and reducing, by a second filter, at least one of the residual acoustic echo or the residual noise from the output signal based at least in part on respective values of the one or more weight modifications.

6. The method as recited in claim 5, wherein the acoustic echo is based at least in part on a microphone capturing the sound and a speaker subsequently outputting the sound.

7. The method as recited in claim 5, further comprising:
determining that a voice is represented within the audio signal based at least in part on an algorithm associated with the adaptive filter;
in response to determining that the voice is represented within the audio signal,
modifying one or more weights of the algorithm to generate one or more modified weights; and
transmitting respective values of the one or more modified weights to the second filter, the second filter reducing the at least one of the residual acoustic echo or the residual noise based at least in part on the respective values of the one or more modified weights.

8. The method as recited in claim 7, further comprising:
determining a subsequent audio signal; and
modifying the one or more modified weights based at least in part on the subsequent audio signal and in response to transmitting the respective values of the one or more modified weights to the second filter.

9. The method as recited in claim 5, further comprising:
determining that a voice is represented within the audio signal; and
in response to determining that the voice is represented within the audio signal, bypassing the audio signal with respect to the adaptive filter.

10. The method as recited in claim 9, further comprising:
determining that one or more of the acoustic echo or the noise is included within the audio signal; and
in response to determining that one or more of the acoustic echo or the noise is included within the audio signal, reducing the acoustic echo or the noise associated with the audio signal.

11. The method as recited in claim 5, further comprising:
detecting speech represented within the audio signal; and
in response to detecting the speech represented within the audio signal, determining one or more words or phrases of the speech.

12. A system comprising:
memory;
one or more processors;
one or more computer-executable instructions stored in the memory and executable by the one or more processors to:

reduce acoustic echo associated with an audio signal and reduce noise associated with the audio signal to generate an output signal;

determine residual acoustic echo associated with the output signal;

determine residual noise associated with the output signal; and reduce at least one of the residual acoustic echo or the residual noise from the output signal by:

synchronizing the audio signal and the output signal by delaying the audio signal to account for an amount of time to reduce the residual acoustic echo or the residual noise from the output signal, wherein delaying the audio signal results in a delayed audio signal;

removing, by an adaptive filter, the acoustic echo and the noise to generate an adapted signal;

determining an error signal based at least in part on a difference between the delayed audio signal and the adapted signal;

determining, based at least in part on the error signal, one or more weight modifications to the adaptive filter; and reducing, by a second filter, at least one of the residual acoustic echo or the residual noise from the output signal based at least in part on respective values of the one or more weight modifications.

13. The system as recited in claim 12, wherein the one or more computer-executable instructions are further executable by the one or more processors to determine the audio signal based at least in part on audio captured by multiple microphones.

14. The system as recited in claim 12, wherein the one or more computer-executable instructions are further executable by the one or more processors to:

determine that the audio signal is generated by multiple microphones; and perform spatial filtering on the audio signal to determine that the audio signal is associated with the noise and the acoustic echo.

15. The system as recited in claim 12, wherein the one or more computer-executable instructions are further executable by the one or more processors to:

determine that the acoustic echo and the noise are associated with the audio signal; and in response to determining that the acoustic echo and the noise are associated with the audio signal, filter the audio signal by reducing at least a portion of the acoustic echo and the noise.

16. The system as recited in claim 15, wherein the one or more computer-executable instructions are further executable by the one or more processors to:

determine that a target voice is represented within the audio signal; and in response to determining that the target voice is represented within the audio signal, bypass the audio signal.

17. The system as recited in claim 12, wherein the one or more computer-executable instructions are further executable by the one or more processors to:

reduce the acoustic echo and the noise associated with the audio signal in response to determining that the acoustic echo and the noise is at or above a predetermined threshold; and bypass the audio signal in response to determining that the acoustic echo and the noise is below the predetermined threshold.

18. The system as recited in claim 12, wherein the system is associated with a voice-controlled device that includes multiple microphones and a speaker, and wherein the acoustic echo is based at least in part on one of the multiple microphones capturing previously captured audio that is output by the speaker.

19. A method comprising:

reduce acoustic echo associated with an audio signal and reduce noise associated with the audio signal to generate an output signal;

determine residual acoustic echo associated with the output signal;

determine residual noise associated with the output signal; and reduce at least one of the residual acoustic echo or the residual noise from the output signal by:

synchronizing the audio signal and the output signal by delaying the audio signal to account for an amount of time to reduce the residual acoustic echo or the residual noise from the output signal, wherein delaying the audio signal results in a delayed audio signal;

removing, by an adaptive filter, the acoustic echo and the noise to generate an adapted signal;

determining an error signal based at least in part on a difference between the delayed audio signal and the adapted signal;

determining, based at least in part on the error signal, one or more weight modifications to the adaptive filter; and reducing, by a second filter, at least one of the residual acoustic echo or the residual noise from the output signal based at least in part on respective values of the one or more weight modifications.

20. The method as recited in claim 19, further comprising:

determining that a target voice is represented within the audio signal; and in response to determining that the target voice is represented within the audio signal, bypassing the audio signal.

21. The method as recited in claim 19, further comprising:

reducing the acoustic echo and the noise associated with the audio signal in response to determining that the acoustic echo and the noise is at or above a predetermined threshold; and bypassing the audio signal in response to determining that the acoustic echo and the noise is below the predetermined threshold.

22. The method as recited in claim 19, further comprising:

detecting speech represented within the audio signal; and in response to detecting the speech represented within the audio signal, determining one or more words or phrases of the speech.

23. The method as recited in claim 19, further comprising:

determining that the audio signal is generated by multiple microphones; and performing spatial filtering on the audio signal to determine that the audio signal is associated with the noise and the acoustic echo.

* * * * *